United States Patent
Greenwood et al.

(10) Patent No.: US 11,716,788 B2
(45) Date of Patent: Aug. 1, 2023

(54) HEATER CONTROL SYSTEM BASED ON SLOPE OF SUPPLY CURRENT

(71) Applicant: Gentherm Inc., Northville, MI (US)

(72) Inventors: Shane Greenwood, Walled Lake, MI (US); Casey Saenz, Farnington Hills, MI (US)

(73) Assignee: Gentherm GmbH, Odelzhausen (DE)

( * ) Notice: Subject to any disclaimer, the term of this patent is extended or adjusted under 35 U.S.C. 154(b) by 676 days.

(21) Appl. No.: 16/793,436

(22) Filed: Feb. 18, 2020

(65) Prior Publication Data
US 2021/0259052 A1    Aug. 19, 2021

(51) Int. Cl.
*H05B 1/02* (2006.01)
*B60N 2/56* (2006.01)
*B62D 1/06* (2006.01)

(52) U.S. Cl.
CPC ......... *H05B 1/0236* (2013.01); *H05B 1/0238* (2013.01); *B60N 2/5678* (2013.01); *B62D 1/06* (2013.01)

(58) Field of Classification Search
CPC ................................ B60N 2/5678; B62D 1/06
See application file for complete search history.

(56) References Cited

U.S. PATENT DOCUMENTS

| | | | |
|---|---|---|---|
| 4,523,084 A | 6/1985 | Tamura et al. | |
| 6,080,973 A | 6/2000 | Thweatt, Jr. | |
| 10,077,745 B2 * | 9/2018 | Tonkin | F02M 31/13 |
| 10,221,817 B2 | 3/2019 | Tonkin et al. | |
| 2012/0234816 A1 * | 9/2012 | Petrenko | H05B 3/84 219/203 |
| 2014/0253151 A1 * | 9/2014 | Kandler | G01L 1/144 324/686 |
| 2019/0031060 A1 | 1/2019 | Rappl et al. | |
| 2019/0187642 A1 | 6/2019 | Lee et al. | |

FOREIGN PATENT DOCUMENTS

| | | |
|---|---|---|
| CN | 110680221 A | 1/2020 |
| DE | 102012004526 A1 | 9/2013 |
| DE | 102012023366 A1 | 6/2014 |
| DE | 102017217194 A1 | 3/2019 |
| WO | WO-2017137023 A1 | 8/2017 |

OTHER PUBLICATIONS

International Search Report and Written Opinion dated May 6, 2021 corresponding to International Application No. PCT/2021/014512, 8 pages.

* cited by examiner

*Primary Examiner* — Dana Ross
*Assistant Examiner* — Joe E Mills, Jr.

(57) ABSTRACT

A heater control system includes a heater driver, a current sensor, a slope calculator, and a mode selector. The heater driver is configured to control current to a heater. The current sensor is configured to sense current supplied to the heater. The slope calculator is configured to calculate a slope of the current supplied to the heater. The mode selector is configured to adjust current supplied to the heater by the heated driver based on the slope of the current.

18 Claims, 7 Drawing Sheets ated as prior art against the present disclosure.

HEATER CONTROL SYSTEM BASED ON SLOPE OF SUPPLY CURRENT

FIELD

The present disclosure relates to heater control systems and more particularly to heater control systems without temperature sensors.

BACKGROUND

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

When an occupant enters a vehicle after the vehicle is off for an extended period in a cold ambient environment, the temperature of exposed interior surfaces of the vehicle are at or near ambient temperature. When the occupant enters the vehicle after a long soak at low ambient temperatures, the interior surfaces may initially feel uncomfortable. Heaters are used to heat some of the exposed interior surfaces of the vehicle that are in contact with the occupants of the vehicle. For example, heaters may be used to heat seats and/or a steering wheel of the vehicle. When turned on, the heaters rapidly heat the exposed interior surfaces to a comfortable temperature without overheating the surfaces.

Control systems of heaters for seats and steering wheels may include one or more temperature sensors to sense the temperature of the exposed surfaces. The temperature sensors may include negative temperature coefficient (NTC) temperature sensors. Each temperature sensor tracks a local temperature of a portion of the seat or steering wheel. A controller receives the sensed temperature of the temperature sensor, estimates a temperature of the corresponding surface and adjusts power output to the corresponding heater.

Some manufacturers use heater control systems that do not use temperature sensors. For example, these heater control systems may determine a temperature of an exposed interior surface by calculating the resistance of the heater wire during heating based upon an instantaneous resistance, a thermal coefficient of the heating wire, and a reference resistance of the heater at a known temperature (e.g. during manufacture or at vehicle start using a temperature sensor). However, some manufacturers may refuse to provide a known temperature reference.

Some heater control systems attempt to determine heater wire temperature based on current supplied to the heater. This approach can be used if the resistance of the heater wire can be determined accurately. However, this approach does not work in systems with relatively high resistance tolerance ranges (such as +1-10%). In systems with relatively high resistance tolerance ranges, a reference resistance may be used to increase accuracy. However, using the reference resistance is relatively complex and costly.

SUMMARY

A heater control system is provided and includes a heater driver, a current sensor, a slope calculator, and a mode selector. The heater driver is configured to control current to a heater. The current sensor is configured to sense current supplied to the heater. The slope calculator is configured to calculate a slope of the current supplied to the heater. The mode selector is configured to adjust current supplied to the heater by the heated driver based on the slope of the current.

In other features, the heater driver is configured to use pulse width modulation (PWM) having a duty cycle, and wherein the mode selector is configured to adjust the duty cycle of the heater based on the slope of the current.

In other features, the mode selector is configured to define slope ranges, select one of the slope ranges based on the slope of the current, and adjust the current supplied by the heater based on the selected one of the slope ranges.

In other features, the heater control system further includes a low pass filter arranged between the current sensor and the slope calculator.

In other features, the mode selector is configured to receive a battery voltage value and adjust the current supplied to the heater based on the battery voltage value.

In other features, the mode selector includes N modes, where N is an integer greater than two, and where each of the N modes corresponds to a distinct current slope range.

In other features, the mode selector is configured to decrease a duty cycle of the heater driver as the slope of the current decreases.

In other features, the heater control system further includes a timer configured to reset when the heater is turned on, where the mode selector is configured to select a predetermined duty cycle for the heater after the timer reaches a predetermined period.

In other features, the mode selector includes a first mode, a second mode and a third mode. The first mode is selected when the slope of the current is in a first current slope range. The mode selector selects a first duty cycle when the slope of the current is in the first current slope range. The second mode is selected when the slope of the current is in a second current slope range. The mode selector selects a second duty cycle when the slope of the current is in the second current slope range. The third mode is selected when the slope of the current is in a third current slope range. The mode selector selects a third duty cycle when the slope of the current is in the third current slope range. The first current slope range is greater than the second current slope range. The second current slope range is greater than the third current slope range. The first duty cycle is greater than the second duty cycle. The second duty cycle is greater than the third duty cycle.

In other features, a system is provided and includes the heater control system, the heater, and a seat including the heater.

In other features, a system is provided and includes the heater control system, the heater, and a steering wheel including the heater.

In other features, a heater control system is provided and includes a heater driver, a current sensor, a slope calculator, and a temperature estimator. The heater driver configured to supply current to a heater. The current sensor is configured to sense current supplied to the heater. The slope calculator is configured to calculate a slope of the current supplied to the heater. The temperature estimator is configured to estimate a temperature of a heated surface based on the slope of the current. The heater driver is configured to receive a temperature setpoint and the estimated temperature of the heated surface.

In other features, the heater driver is configured to use pulse width modulation (PWM) having a duty cycle, and wherein the heater driver is configured to adjust the duty cycle of the heater based on a difference between the temperature setpoint and the estimated temperature of the heated surface.

In other features, the heater control system further includes a low pass filter arranged between the current sensor and the slope calculator.

In other features, the heater driver is configured to receive a battery voltage value and adjust the current supplied to the heater further based on the battery voltage value.

In other features, the heater driver is configured to decrease a duty cycle of the heater driver as the slope of the current decreases.

In other features, a system is provided and includes the heater control system, the heater, and a seat including the heater.

In other features, a system is provided and includes the heater control system, the heater, and a steering wheel including the heater.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Figure 1:
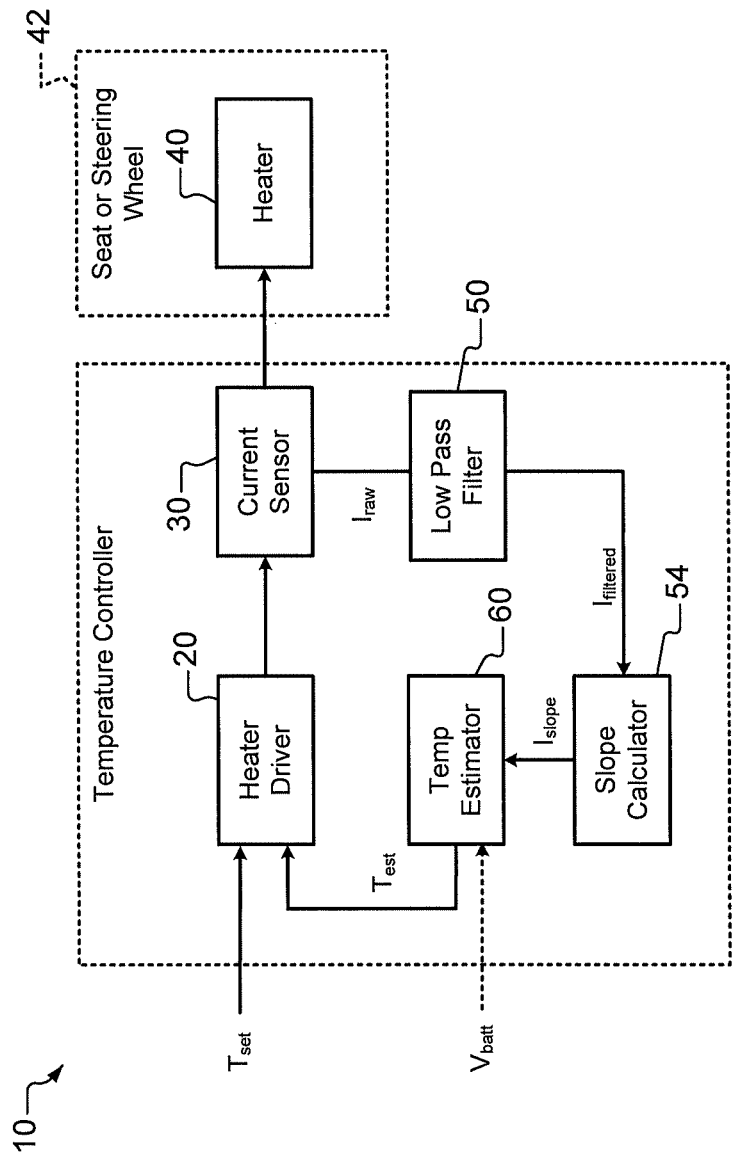
FIG. 1 is a functional block diagram of an example of a heater control system according to the present disclosure.

While the foregoing disclosure relates to seat heaters and/or steering wheels, the systems and methods described herein can be used for other heaters in other locations. The present disclosure relates to a heater control system that senses a slope of current supplied to the heater and estimates a temperature of a surface that is being heated based thereon. In other examples, the slope of the current supplied to the heater is used to determine when to switch a heater driver from a high or variable duty cycle mode to initiate fast heating of an interior surface to a predetermined or fixed duty cycle mode to maintain a target temperature range without causing discomfort to the occupant.

The heater control system does not require a temperature sensor or a reference resistance. As a result, the temperature sensor, connection wiring, and at least two terminals of a heater connector can be eliminated, which reduces cost. Eliminating components such as the temperature sensor and wiring also tends to increase reliability. In other words, accurate control of the temperature of the seat surface can be accomplished at a lower cost without the temperature sensor or the reference resistance.

Due to a positive temperature coefficient (PTC) effect of the heater wire, the current supplied to the heater tends to drop as the heater wire self-heats. The PTC effect leads to a non-constant, exponential decrease in current as the temperature of the heater wire increases. In other words, the rate-of-change or slope of current d reduces proportionally as wire temperature increases. There is a fixed correlation based on the particular seat and heater design that are used. By monitoring the slope of the current, the wire temperature and seat surface temperature can be estimated accurately.

The current level may also depend on the voltage received from the battery. For example, after starting the vehicle after a long soak, the voltage of the battery may be lower. Therefore in some examples, different scaling factors or adjustments may be used based on where the battery voltage lies relative to a nominal battery voltage and/or a plurality of voltage ranges. The self-heating rate of the wire is primarily affected by heat transfer to surrounding components, and should not vary significantly with resistance tolerances of the finished goods.

In some examples, the slope of the current is monitored after the heater is turned on to determine when the heater is approaching a target operating temperature. When the slope indicates that the target operating temperature is reached, the controller switches to a predetermined or fixed duty cycle to maintain the desired temperature. In other words, a duty cycle that accurately maintains the desired seat surface temperature is calibrated for the seat. The systems and methods described herein eliminate the temperature sensor and related components from the heater control system while maintaining accurate temperature control of the heated surface.

Referring now to FIG. 1, a heater controller 10 includes a heater driver 20. In some examples, the heater driver 20 generates pulse width modulated (PWM) signals having a variable duty cycle (DC) that are output to a heater 40 (e.g. for a seat, a steering wheel or other heated surface). As can be appreciated, higher DC values may be used when the surface to be heated is cool/cold to reduce the time required to heat the surface. As the temperature of the heater wire and the interior surface increases, lower DC values may be used to prevent discomfort due to overheating.

A current sensor 30 is arranged between the heater driver 20 and the heater 40 to sense current $I_{raw}$ supplied to the heater 40. In some examples, a low-pass filter 50 is used to filter the current $I_{raw}$ to reduce noise and to generate a filtered current $I_{filtered}$.

A slope calculator 54 receives the filtered current $I_{filtered}$, calculates a slope of the filtered current $I_{filtered}$ during a predetermined period and outputs a current slope $I_{slope}$. A temperature estimator 60 estimates a temperature of a heated surface based on the current slope $I_{slope}$. For example only, the temperature estimator 60 includes a lookup table or a formula that determines the estimated temperature $T_{est}$ based on the current slope $I_{slope}$.

In some examples, the temperature estimator 60 indexes the lookup table using the current slope $I_{slope}$. In some examples, the temperature estimator 60 determines the estimated temperature $T_{est}$ further based on the voltage of the battery $V_{batt}$. For example, the temperature estimator 60 compares the voltage of the battery $V_{batt}$ to the nominal battery voltage and/or two or more voltage ranges and selects one of a plurality of lookup tables or formulas or adjusts a formula based on the comparison. Then, the temperature estimator 60 access the selected lookup table, uses the selected formula or adjusts the formula based on the current slope $I_{slope}$. The heater driver 20 receives the temperature setpoint $T_{set}$ and the estimated temperature $T_{est}$ and sets the DC based thereon. In some examples, the DC is set based on a difference between the temperature setpoint $T_{set}$ and the estimated temperature $T_{est}$.

Figure 2A:
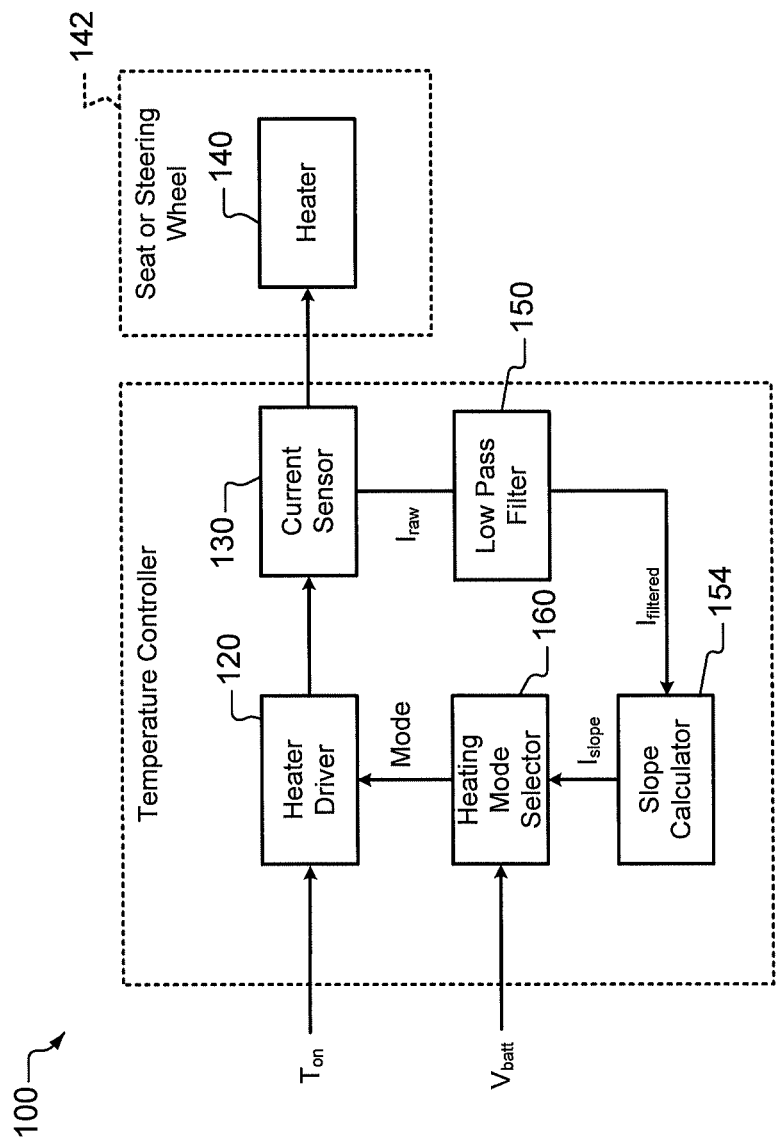
FIGS. 2A and 2B are functional block diagrams of other examples of heater control systems according to the present disclosure.

Referring now to FIG. 2A, a heater controller 100 is shown to include a heater driver 120. In some examples, the heater driver 120 generates PWM signals having a variable duty cycle (DC) that are output to a heater 140 (e.g. for a seat, a steering wheel or other exposed interior surface of a vehicle). As can be appreciated, higher DC values may be used when the surface to be heated is cool/cold to quickly heat the surface. As the temperature of the heater wire and the interior surface increases, lower DC values may be used.

A current sensor 130 is arranged between the heater driver 120 and the heater 140 to sense current $I_{raw}$ supplied to the heater 140. In some examples, a low-pass filter 150 is used to filter the current $I_{raw}$ to reduce noise and to generate a filtered current $I_{filtered}$.

A slope calculator 154 receives the filtered current $I_{filtered}$, calculates a slope of the filtered current $I_{filtered}$ and outputs a current slope $I_{slope}$. A heating mode selector 160 selects a heating mode based on the current slope $I_{slope}$. In some examples, the heating mode selector 160 compares the current slope $I_{slope}$ to one of a plurality of slope ranges and selects a mode of the heater based thereon. In other words, the heating mode selector 160 selects different heating control parameters based on the current slope $I_{slope}$. In some examples, the heating mode selector 160 selects one of a plurality of DC values for the heater driver 120 based on the current slope $I_{slope}$.

In some examples, the heating mode selector 160 includes a lookup table or a formula that outputs a desired DC based on the current slope $I_{slope}$. In some examples, the heating mode selector 160 indexes the lookup table using the current slope $I_{slope}$. In some examples, the heating mode selector 160 selects one of a plurality of heating modes based on the current slope $I_{slope}$ as will be described further below. The heating mode selector 160 may select a lookup table or formula or adjust a formula based on the voltage of the battery $V_{batt}$.

Figure 2B:
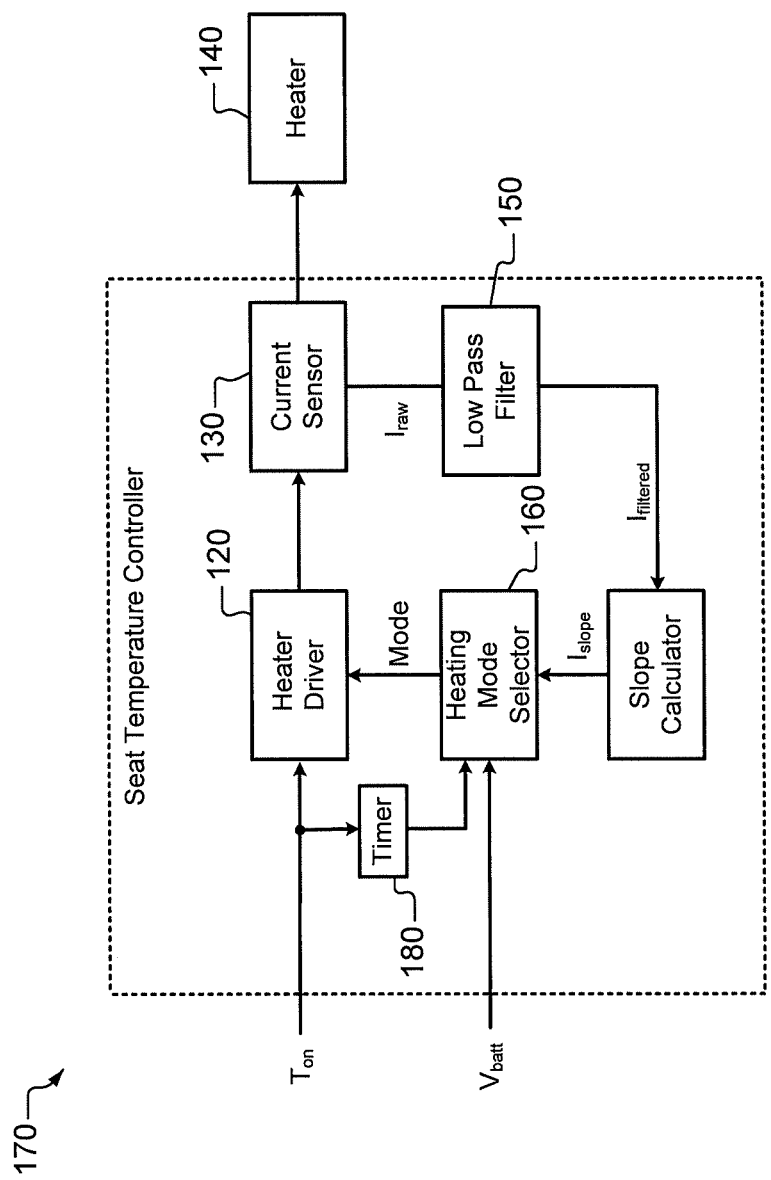

Referring now to FIG. 2B, another heater controller 170 is shown. The heater controller 170 further includes a timer 180 that is reset when the heater transitions to an on state. In some examples, the heating mode selector 160 transitions to an open loop mode where the DC of the heater driver 120 is set to a predetermined or fixed DC after a predetermined period of operation to maintain a selected heater setting as determined by the timer 180.

Figure 3A:
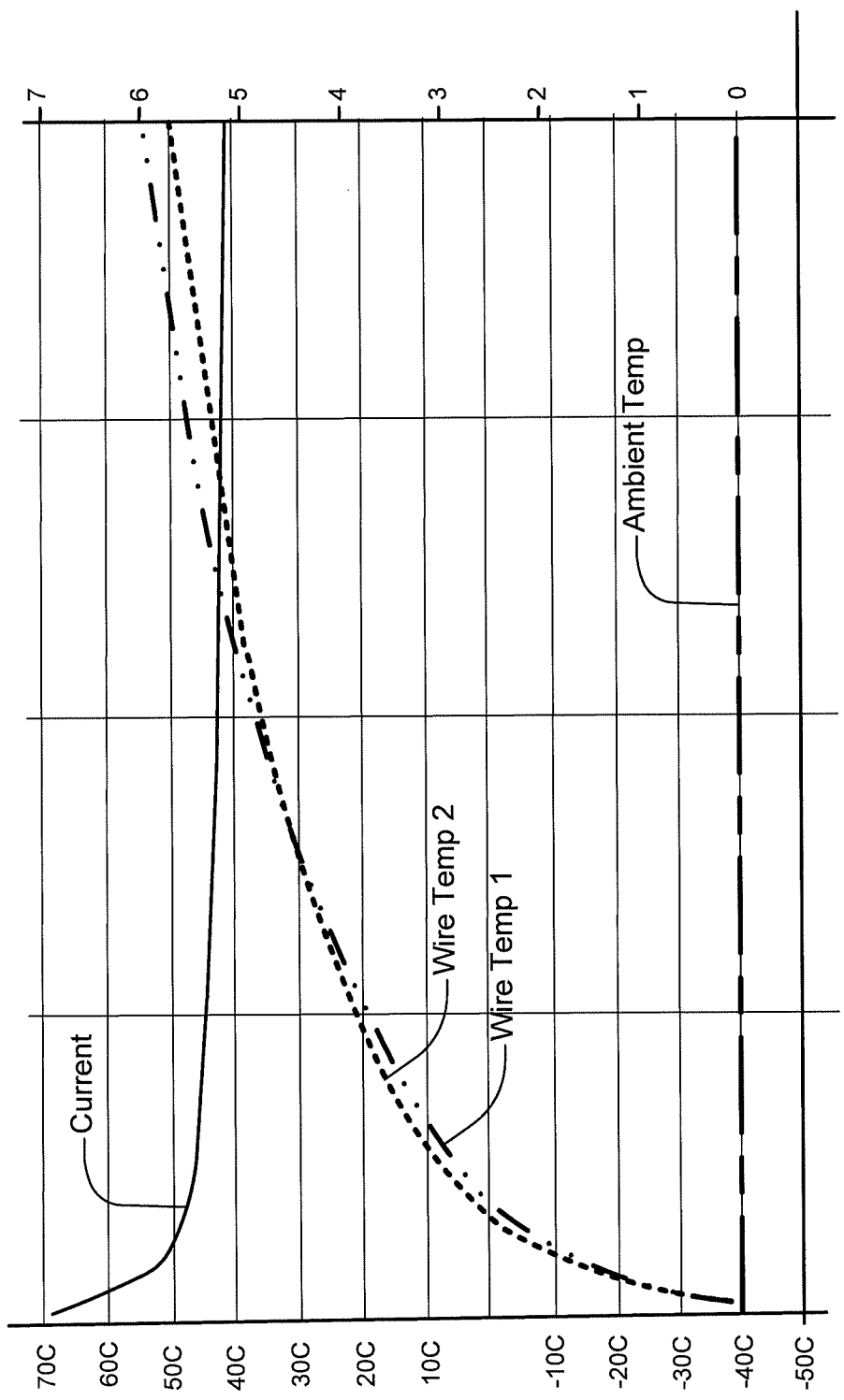
FIG. 3A is a graph illustrating current supplied to a heater and a temperature of a heater wire according to the present disclosure.
Figure 3B:
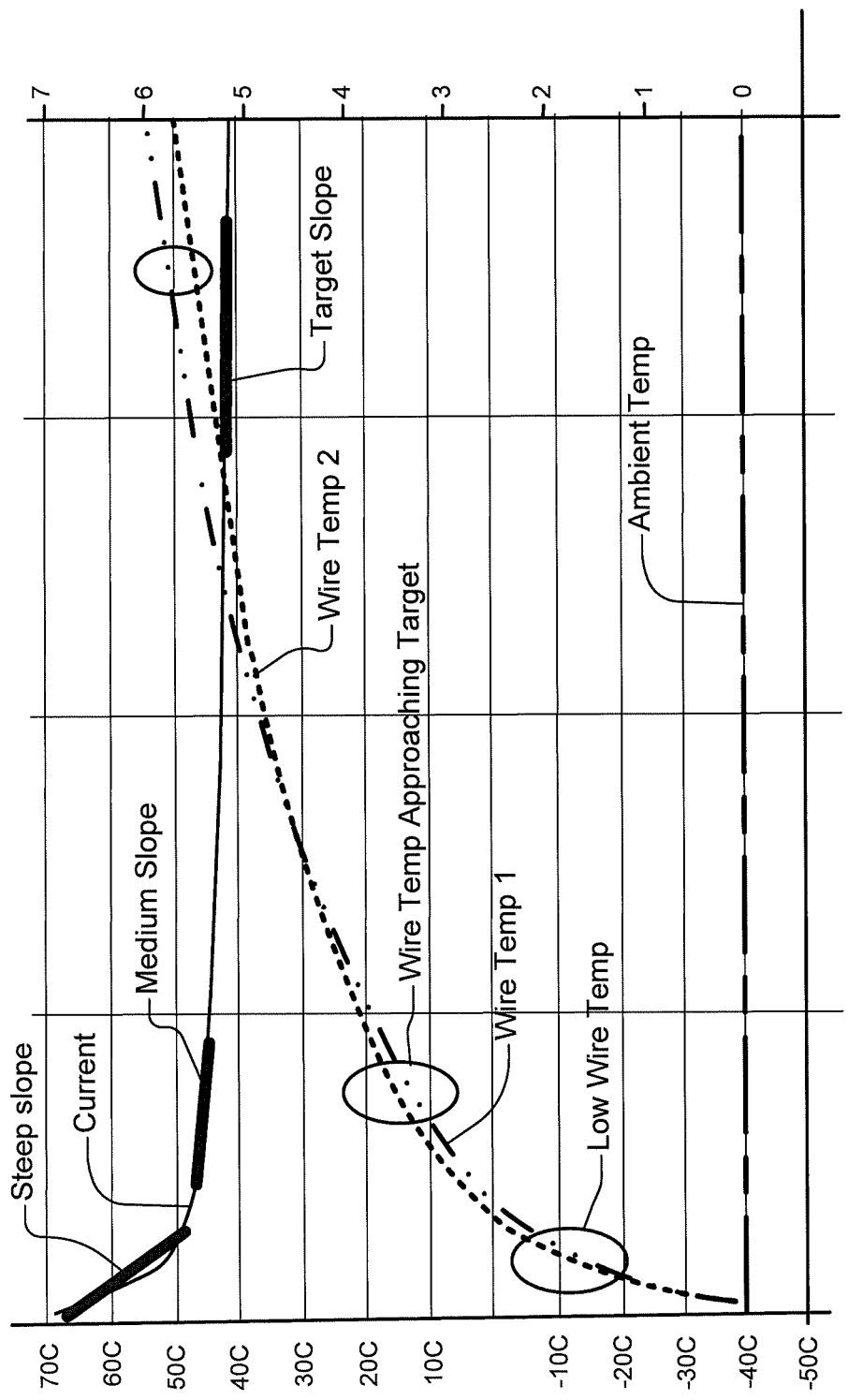
FIG. 3B is a graph illustrating current supplied to a heater, a temperature of a heater wire and different current slope regions according to the present disclosure.

Referring now to FIGS. 3A and 3B, a graph is shown illustrating current supplied to a heater and a temperature of a heater wire. In FIG. 3B, the current is sampled over time and the current slope $I_{slope}$ is calculated during a predetermined period. In FIG. 3B, a steep slope value typically occurs when the heater is initially turned on after a long soak at low ambient temperatures. When the heater wire and the interior surface are cold, the current supplied to the heater 140 is relatively high and decreases rapidly due to self-heating of the heater wire. At this point, the current slope is in a first or high slope range. The heating mode selector 160 can set a relatively high DC value to heat the surface quickly without causing discomfort to the occupant when the target slope range is reached.

As the wire self-heats, the current continues to decrease and the slope of the current decreases from the high slope range to lower slope values corresponding to a second or middle slope range. The heating mode selector 160 can reduce the DC value to heat the surface less quickly to avoid causing discomfort to the occupant. As the wire heats further, the current further decreases and starts to stabilize. The slope values of the current decreases to a target slope range. In some examples, a target or fixed duty cycle is used when in the target slope range.

When using the heater control system in FIG. 2A, the target duty cycle is reached when the current slope $I_{slope}$ reaches the target slope range (independent of time). When using the heater control system in FIG. 2B, the target duty cycle is reached when the current slope $I_{slope}$ reaches the target slope range or the predetermined period of the timer expires (whichever occurs first).

Figure 4:
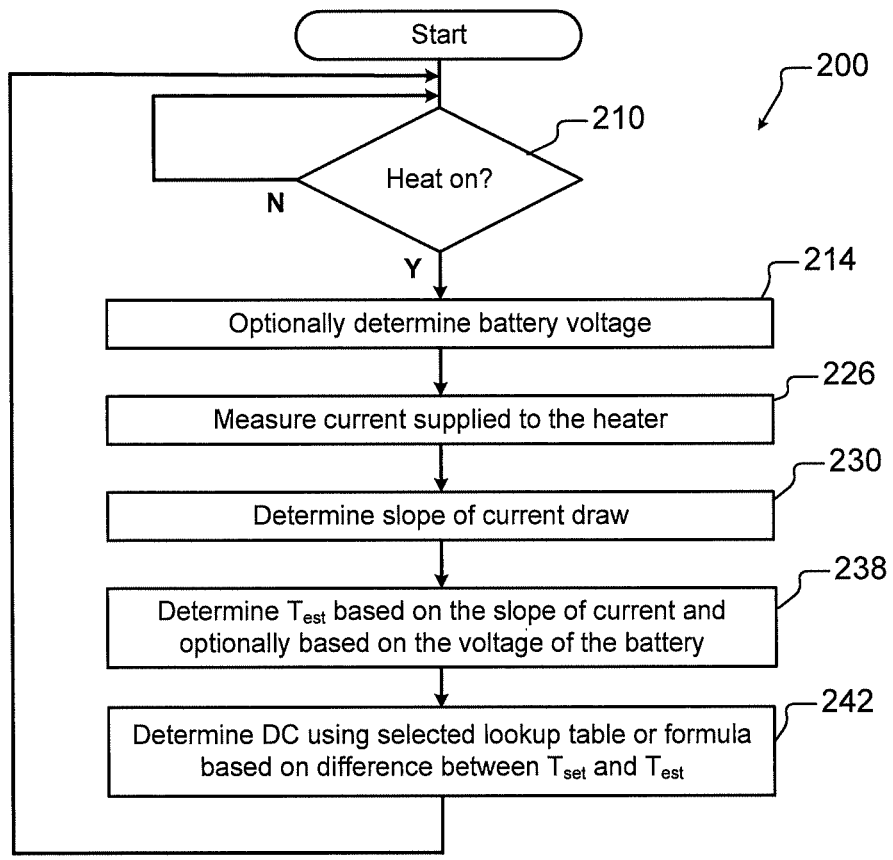
FIG. 4 is a flowchart of a method for controlling a heater based on current slope according to the present disclosure.

Referring now to FIG. 4, a flowchart of a method 300 for controlling a heater based on current slope is shown. At 210, the method determines whether the heater is on. If 210 is true, the method continues at 214 and optionally determines battery voltage. At 226, the method measures the current supplied to the heater. In some examples, low pass filtering is used to reduce noise in the measured current. At 230, the method determines the slope of the current. At 238, the method estimates the temperature of the heated surface based on the current and optionally based on the voltage of the battery. In some examples, the heater driver sets the DC based on the temperature setpoint and the estimated temperature. In other examples, the heater driver sets the DC based on a difference between the temperature setpoint and the estimated temperature at 242.

Figure 5:
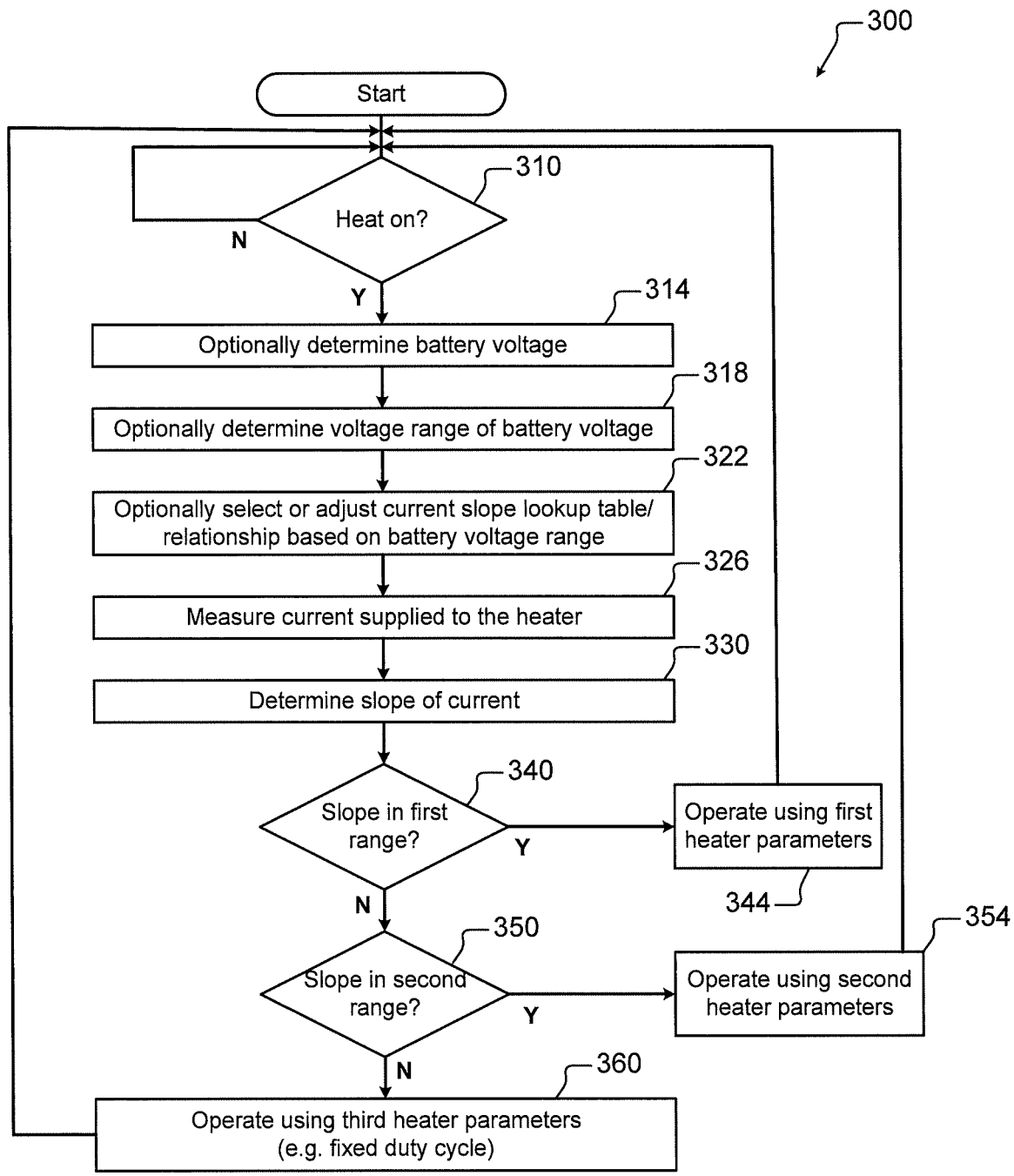
FIG. 5 is a flowchart of a method for controlling a heater based on current slope according to the present disclosure.

Referring now to FIG. 5, a flowchart of a method 300 for controlling a heater based on current slope is shown. At 310, the method determines whether the heater is on. If 310 is true, the method continues at 314 and optionally determines battery voltage. At 318, the method optionally selects a voltage range corresponding to the battery voltage. At 322, the method optionally selects or adjusts a current slope lookup table or formula based on the selected voltage range of the battery voltage.

At 326, the method measures the current supplied to the heater. In some examples, low pass filtering is used to reduce noise. At 330, the method determines the slope of the current. At 340, the method determines whether the current slope is in a first slope range. If 340 is true, then the heater is operated using a first set of heater parameters at 344. For example, the first set of heater parameters may set the DC of the heater driver to a first value or a first range of DC values.

If 340 is false, the method determines whether the current slope is in a second slope range at 350. If 340 is true, then the heater is operated using a second set of heater parameters at 354. For example, the second set of heater parameters may set the DC of the heater driver to a second value or a second range of DC values. In some examples, the second value or DC range is less than the first value or DC range.

If 350 is false, then the heater is operated using a third set of heater parameters at 360. For example, the third set of heater parameters may set the DC of the heater driver to fixed DC value or a third range of DC values. In some examples, the third value or DC range is less than the first value or DC range and the second value or DC range. While three different modes are shown, additional or fewer modes can be used.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP:

Hypertext Preprocessor), Scala, Eiffel, Smalltalk, Erlang, Ruby, Flash®, Visual Basic®, Lua, MATLAB, SIMULINK, and Python®.

What is claimed is:

1. A heater control system, comprising:
   a heater driver configured to control current to a heater;
   a current sensor configured to sense current supplied to the heater;
   a controller configured to:
   calculate a slope of the current supplied to the heater; and
   adjust current supplied to the heater by the heated driver based on the slope of the current.

2. The heater control system of claim 1, wherein the heater driver is configured to use pulse width modulation (PWM) having a duty cycle, and wherein the controller is configured to adjust the duty cycle of the heater based on the slope of the current.

3. The heater control system of claim 1, wherein the controller is configured to define a plurality of slope ranges, select one of the plurality of slope ranges based on the slope of the current, and adjust the current supplied by the heater based on the selected one of the plurality of slope ranges.

4. The heater control system of claim 1, further comprising a low pass filter arranged between the current sensor and the controller.

5. The heater control system of claim 1, wherein the controller is configured to receive a battery voltage value and adjust the current supplied to the heater based on the battery voltage value.

6. The heater control system of claim 1, wherein the controller includes N modes, where N is an integer greater than two, and wherein each of the N modes corresponds to a distinct current slope range.

7. The heater control system of claim 1, wherein the controller is configured to decrease a duty cycle of the heater driver as the slope of the current decreases.

8. The heater control system of claim 1, further comprising a timer configured to reset when the heater is turned on, wherein the controller is configured to select a predetermined duty cycle for the heater after the timer reaches a predetermined period.

9. The heater control system of claim 1, wherein the controller is configured to:
   select a first mode when the slope of the current is in a first current slope range;
   select a first duty cycle when the slope of the current is in the first current slope range;
   select a second mode when the slope of the current is in a second current slope range;
   select a second duty cycle when the slope of the current is in the second current slope range;
   select a third mode when the slope of the current is in a third current slope range;
   select a third duty cycle when the slope of the current is in the third current slope range;
   the first current slope range is greater than the second current slope range;
   the second current slope range is greater than the third current slope range;
   the first duty cycle is greater than the second duty cycle; and
   the second duty cycle is greater than the third duty cycle.

10. A system comprising:
    the heater control system of claim 1;
    the heater; and
    a seat including the heater.

11. A system comprising:
    the heater control system of claim 1;
    the heater; and
    a steering wheel including the heater.

12. A heater control system, comprising:
    a heater driver configured to supply current to a heater;
    a current sensor configured to sense current supplied to the heater;
    a controller configured to:
    calculate a slope of the current supplied to the heater; and
    estimate a temperature of a heated surface based on the slope of the current,
    wherein the heater driver is configured to receive a temperature setpoint and the estimated temperature of the heated surface.

13. The heater control system of claim 12, wherein the heater driver is configured to use pulse width modulation (PWM) having a duty cycle, and wherein the heater driver is configured to adjust the duty cycle of the heater based on a difference between the temperature setpoint and the estimated temperature of the heated surface.

14. The heater control system of claim 12, further comprising a low pass filter arranged between the current sensor and the controller.

15. The heater control system of claim 12, wherein the heater driver is configured to receive a battery voltage value and adjust the current supplied to the heater further based on the battery voltage value.

16. The heater control system of claim 12, wherein the heater driver is configured to decrease a duty cycle of the heater driver as the slope of the current decreases.

17. A system comprising:
    the heater control system of claim 12;
    the heater; and
    a seat including the heater.

18. A system comprising:
    the heater control system of claim 12;
    the heater; and
    a steering wheel including the heater.

* * * * *